United States Patent
Zhang et al.

(10) Patent No.: US 12,556,845 B2
(45) Date of Patent: Feb. 17, 2026

(54) METHOD AND APPARATUS FOR SERVICE PROCESSING IN OPTICAL TRANSPORT NETWORK, AND ELECTRONIC DEVICE

(71) Applicant: ZTE CORPORATION, Guangdong (CN)

(72) Inventors: Yuanbin Zhang, Guangdong (CN); Yan Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/907,838

(22) PCT Filed: Feb. 24, 2021

(86) PCT No.: PCT/CN2021/077708
§ 371 (c)(1),
(2) Date: Aug. 29, 2022

(87) PCT Pub. No.: WO2021/170002
PCT Pub. Date: Sep. 2, 2021

(65) Prior Publication Data
US 2023/0125984 A1    Apr. 27, 2023

(30) Foreign Application Priority Data
Feb. 28, 2020 (CN) .......................... 202010126760.2

(51) Int. Cl.
*H04Q 11/00* (2006.01)
*H04J 3/16* (2006.01)
*H04J 14/00* (2006.01)

(52) U.S. Cl.
CPC ........ *H04Q 11/0062* (2013.01); *H04J 3/1652* (2013.01); *H04J 14/00* (2013.01);
(Continued)

(58) Field of Classification Search
CPC ....... H04Q 11/0062; H04Q 2011/0064; H04Q 2011/0086; H04Q 11/00; H04Q 11/0067; H04J 3/1652; H04J 14/00
(Continued)

(56) References Cited

U.S. PATENT DOCUMENTS

2003/0048813 A1* 3/2003 Lahav .................... H04J 3/1611
370/537
2006/0104309 A1* 5/2006 Vissers ................ H04J 3/1658
370/474
(Continued)

FOREIGN PATENT DOCUMENTS

CN         1770673 A    5/2006
CN       101771489 A    7/2010
(Continued)

OTHER PUBLICATIONS

WIPO, International Search Report issued on May 21, 2021.
(Continued)

*Primary Examiner* — Dibson J Sanchez
(74) *Attorney, Agent, or Firm* — Li & Cai Intellectual Property (USA) Office

(57) ABSTRACT

Embodiments of the present disclosure provides a method for service processing in optical transport network including: mapping a client service into a service container; and mapping the service container into a data frame, wherein the data frame includes payload units, each of the payload units consists of unit blocks with fixed length, and the service container is carried in the unit blocks. The embodiments of the present disclosure also provide an apparatus for service processing in optical transport network, an electronic device, and a computer readable medium.

17 Claims, 7 Drawing Sheets

(52) U.S. Cl.
CPC ...... *H04Q 11/00* (2013.01); *H04Q 2011/0064* (2013.01); *H04Q 11/0067* (2013.01); *H04Q 2011/0086* (2013.01)

(58) Field of Classification Search
USPC .................................................. 398/43–103
See application file for complete search history.

(56) References Cited

U.S. PATENT DOCUMENTS

| | | | | |
|---|---|---|---|---|
| 2008/0075113 | A1* | 3/2008 | Harley | H04B 10/27 370/466 |
| 2009/0208208 | A1* | 8/2009 | Chen | H04J 14/0273 398/45 |
| 2009/0263131 | A1* | 10/2009 | Dong | H04J 3/1658 398/58 |
| 2010/0021173 | A1* | 1/2010 | Zhang | H04J 3/1652 398/98 |
| 2010/0098415 | A1* | 4/2010 | Jiang | H04L 12/40032 398/45 |
| 2010/0142947 | A1* | 6/2010 | Shin | H04J 3/1652 398/43 |
| 2010/0158518 | A1 | 6/2010 | Shin | |
| 2010/0177785 | A1* | 7/2010 | Kisaka | H04L 25/14 370/465 |
| 2010/0209107 | A1* | 8/2010 | Yin | H04J 3/0647 398/98 |
| 2010/0221005 | A1* | 9/2010 | Zhao | H04J 3/1652 398/52 |
| 2011/0286744 | A1* | 11/2011 | Shin | H04J 3/1611 398/43 |
| 2012/0002671 | A1* | 1/2012 | Xiao | H04Q 11/00 398/43 |
| 2012/0002965 | A1* | 1/2012 | Bellato | H04J 3/1652 398/52 |
| 2012/0014270 | A1* | 1/2012 | Honma | H04J 3/1652 370/252 |
| 2012/0230350 | A1* | 9/2012 | Katagiri | H04J 3/1652 370/474 |
| 2015/0139650 | A1* | 5/2015 | Su | H04J 3/1652 398/66 |
| 2015/0222380 | A1 | 8/2015 | Su | |
| 2017/0230736 | A1* | 8/2017 | Su | H04Q 11/0062 |
| 2018/0098076 | A1* | 4/2018 | Su | H04J 3/07 |
| 2018/0375604 | A1* | 12/2018 | Su | H04Q 11/0062 |
| 2019/0140759 | A1* | 5/2019 | Su | H04Q 11/04 |
| 2020/0296486 | A1* | 9/2020 | Xiang | H04J 3/1652 |
| 2020/0366412 | A1* | 11/2020 | Wu | H04J 3/1652 |
| 2021/0083774 | A1* | 3/2021 | Su | H04L 1/0046 |
| 2021/0084383 | A1* | 3/2021 | Xiang | H04N 21/64792 |
| 2022/0052762 | A1* | 2/2022 | Su | H04J 14/08 |
| 2022/0337925 | A1* | 10/2022 | Su | H04Q 11/0067 |

FOREIGN PATENT DOCUMENTS

| | | |
|---|---|---|
| CN | 101800912 A | 8/2010 |
| CN | 101841749 A | 9/2010 |
| CN | 108076486 A | 5/2018 |
| CN | 109981209 A | 7/2019 |
| EP | 2296297 B1 | 9/2012 |
| WO | 2019213901 A1 | 11/2019 |

OTHER PUBLICATIONS

European Patent Office, the Supplementary European search report issued Mar. 19, 2024 for application No. EP21760280.4.
China Patent Office, First Office Action dated Jul. 22, 2025, for corresponding CN application No. 202010126760.2.
China Patent Office, Search Report dated Jul. 17, 2025, for corresponding CN application No. 202010126760.2.

* cited by examiner

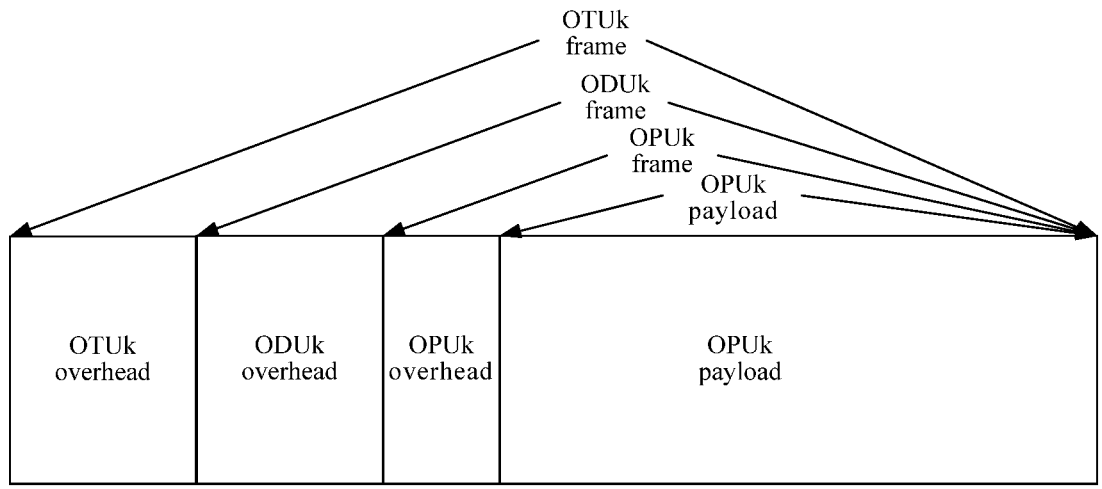
FIG. 1
| | 17 | 18 | 19 | 20 | 21 | 22 | 23 | 24 | 25...... | | 3821 | 3822 | 3823 | 3824 |
|---|---|---|---|---|---|---|---|---|---|---|---|---|---|---|
| 1 | TS1 | TS2 | TS3 | TS4 | TS1 | TS2 | TS3 | TS4 | | | TS1 | TS2 | TS3 | TS4 |
| 2 | TS1 | TS2 | TS3 | TS4 | TS1 | TS2 | TS3 | TS4 | | | TS1 | TS2 | TS3 | TS4 |
| 3 | TS1 | TS2 | TS3 | TS4 | TS1 | TS2 | TS3 | TS4 | | | TS1 | TS2 | TS3 | TS4 |
| 4 | TS1 | TS2 | TS3 | TS4 | TS1 | TS2 | TS3 | TS4 | | | TS1 | TS2 | TS3 | TS4 |
FIG. 2
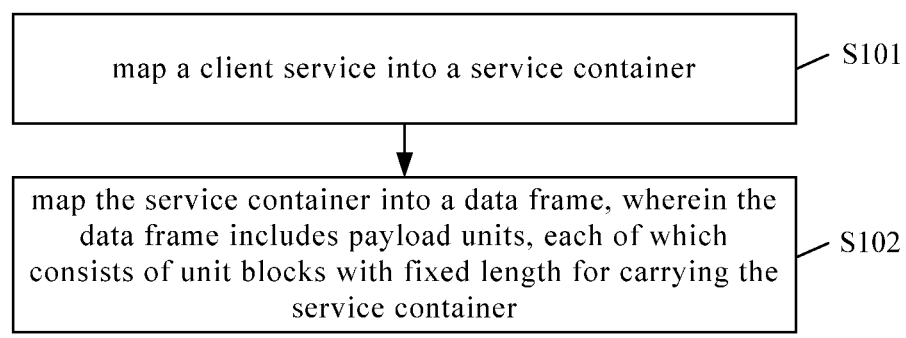
FIG. 3

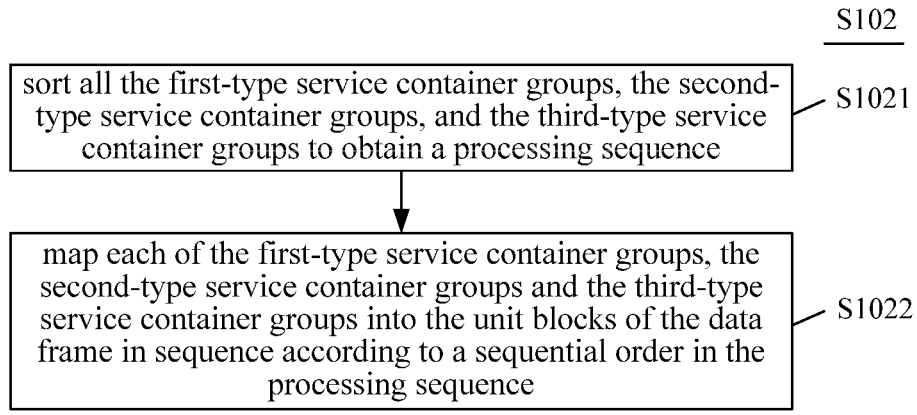
FIG. 7
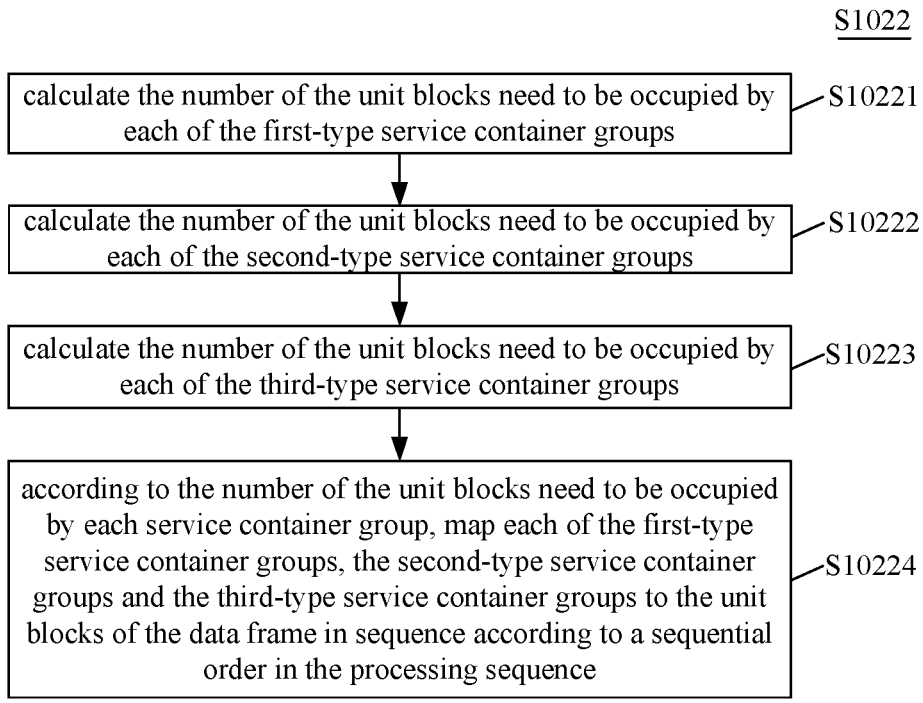
FIG. 8
FIG. 9

METHOD AND APPARATUS FOR SERVICE PROCESSING IN OPTICAL TRANSPORT NETWORK, AND ELECTRONIC DEVICE

CROSS-REFERENCE TO RELATED APPLICATIONS

The present disclosure is a National Phase Application filed under 35 U.S.C. 371 as a national stage of PCT/CN2021/077708, filed on Feb. 24, 2021, an application claiming the priority to Chinese Patent Application No. CN202010126760.2 filed on Feb. 28, 2020, the entire contents of which are incorporated herein by reference.

TECHNICAL FIELD

Embodiments of the present disclosure relates to the field of optical communication technology, and in particular, to a method and an apparatus for service processing in optical transport network, an electronic device, and a computer readable medium.

BACKGROUND

In the definition of the existing Optical Transport Network (OTN), a method for loading multiple service signals into payload of the optical transport network signal is as follows: first, the area of the optical transport network signal is divided into n time slots, which are realized by way of byte interleaving; then, the service signals are loaded into one or more time slots in the payload of the optical transport network signal.

According to the existing optical transport network standard G.709, the minimum time slot granularity of the existing OTN technology is 1.25 Gbps; when bearing services with a bandwidth lower than 1.25 Gbps, such as Fast Ethernet (FE) services, Synchronous Transfer Module-1 (STM-1) services, E1 services and other services with small bandwidth, the bandwidth waste of the optical transport network is very serious. For example, the E1 signal with a bandwidth of 2.048 Mbps is loaded in a time slot with a bandwidth of 1.25 Gbps, and the bandwidth waste is more than 99%. Therefore, a transmission technology is needed to realize a method of efficiently bearing a small-granularity service in the OTN.

SUMMARY

Embodiments of the present disclosure provide a method and an apparatus for service processing in optical transport network, an electronic device, and a computer readable medium.

In a first aspect, an embodiment of the present disclosure provides a method for service processing in optical transport network, including: mapping a client service into a service container; and mapping the service container into a data frame, wherein the data frame includes payload units, each of the payload units consists of unit blocks with fixed length, and the service container is carried in the unit blocks.

In a second aspect, an embodiment of the present disclosure further provides a method for service processing in optical transport network, including: acquiring a data frame, wherein the data frame includes payload units, each of the payload units consists of unit blocks with fixed length, a service container is carried in the unit blocks, and the service container carries a client service; demapping the service container from the unit blocks of the data frame; and acquiring the client service from the service container. In the present disclosure, demapping the service container from the unit blocks of the data frame includes: acquiring configuration information from a payload area, wherein the configuration information includes a unit block type of the unit blocks occupied by a payload unit, a payload unit number, and the number of the unit blocks occupied by the payload unit; determining a location of the payload unit carrying the service container according to the configuration information; and demapping the service container from the unit blocks within the determined payload unit.

In a third aspect, an embodiment of the present disclosure further provides an apparatus for service processing in optical transport network, including: a first mapping module configured to map a client service into a service container; and a second mapping module configured to map the service container into a data frame, wherein the data frame includes payload units, each of the payload units consists of unit blocks with fixed length, and the service container is carried in the unit blocks.

In a fourth aspect, an embodiment of the present disclosure further provides an apparatus for service processing in optical transport network, including: a first acquisition module configured to acquire a data frame, wherein the data frame includes payload units, each of the payload units consists of unit blocks with fixed length, a service container is carried in the unit blocks, and the service container carries a client service; a demapping module configured to demap the service container from the unit blocks of the data frame; and a second acquisition module configured to acquire the client service from the service container.

In a fifth aspect, an embodiment of the present disclosure further provides an electronic device including: one or more processors; and a memory storing one or more programs thereon, wherein the one or more programs, when executed by the one or more processors, cause the one or more processors to implement the method for service processing provided in either the first aspect or the second aspect.

In a sixth aspect, an embodiment of the present disclosure further provides a computer readable medium storing a computer program thereon, wherein the computer program, when executed by a processor, cause the processor to implement the method for service processing provided in either the first aspect or the second aspect.

BRIEF DESCRIPTION OF DRAWINGS

FIG. 1 is a schematic diagram of an optical channel frame structure involved in the present disclosure;

FIG. 2 is a schematic diagram that the payload area of the optical channel frame structure is divided into 4 time slots in the optical transport standard in the related art;

FIG. 3 is a flowchart of a method for service processing in optical transport network according to the present disclosure;

FIG. 7 is a schematic structural diagram of configuration information in the present disclosure;

FIG. 8 is a flowchart of a specific implementation of Operation S102 in the present disclosure;

FIG. 9 is a flowchart of a specific implementation of Operation S1022 in the present disclosure;

DETAIL DESCRIPTION OF EMBODIMENTS

Figure 4:
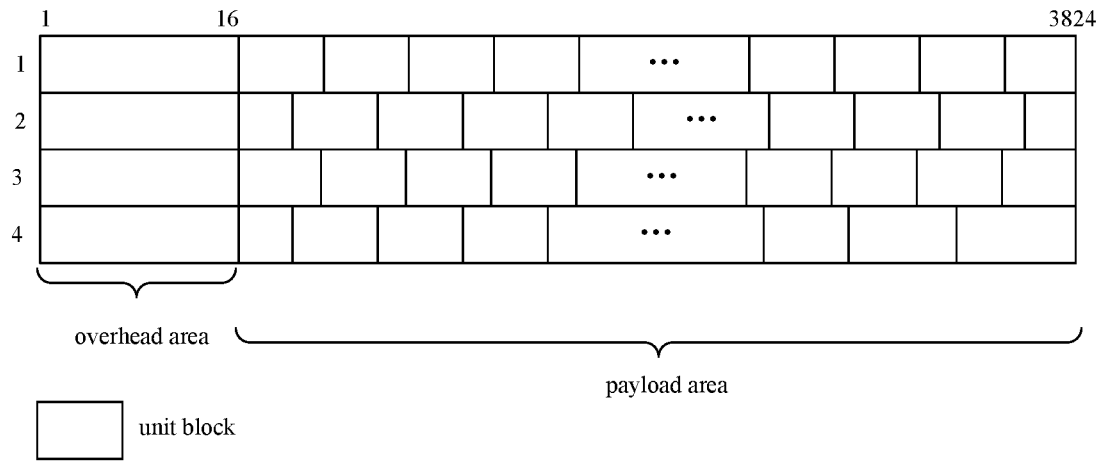
FIG. 4 is a schematic diagram of dividing an OTUk frame into unit blocks in the present disclosure.

In order for those skilled in the art to better understand the technical solutions of the present disclosure, a method and an apparatus for service processing in optical transport network, an electronic device, and a computer readable medium provided by the present disclosure will be described in detail below in combination with the accompanying drawings.

Exemplary embodiments will be described more fully hereinafter with reference to the accompanying drawings although they may be embodied in different forms and should not be construed as limited to the embodiments set forth herein. Rather, these embodiments are provided so that this disclosure will be thorough and complete, and will fully convey the scope of the disclosure to those skilled in the art.

Various embodiments of the present disclosure and various features in the embodiments may be combined with each other as long as there is no conflict.

As used herein, the term "and/or" includes any and all combinations of one or more of the associated listed items.

The terms used herein are used to describe particular embodiments only and are not intended to limit the present disclosure. As used herein, the singular forms "a" and "the" are intended to include the plural forms as well, unless the context clearly dictates otherwise. It will also be understood that when the terms "comprising" and/or "made of" are used in this specification, the stated features, integers, steps, operations, elements and/or components are specified to be present, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will also be understood that terms such as those defined in commonly used dictionaries should be construed as having meanings consistent with their meanings in the context of the related art and this disclosure, and will not be construed as having idealized or over-formal meanings, unless explicitly so limited herein.

FIG. 1 is a schematic diagram of an optical channel frame structure involved in the present disclosure. As shown in FIG. 1, in the present disclosure, description is made by taking an example that the optical transport network signal is an Optical channel Transport Unit (OTU) signal. The OTU signal consists of OTUk frames, including an overhead area and a payload area. The overhead area includes: overhead of Optical channel Transport Unit (referred to as "OTUk overhead", k can take values of 1, 2, 3, 4), overhead of Optical channel Data Unit (ODU) (referred to as "ODUk overhead", k can take values 0, 1, 2, 2e, 3, 4), and overhead of Optical channel Payload Unit (OPU) (referred to as "OPUk overhead", k can take values of 0, 1, 2, 2e, 3, 4). The remainder of the OTUk frame except the OTUk overhead is referred to as the ODUk frame, the remainder of the ODUk frame except the ODUk overhead is referred to as the OPUk frame, and the remainder of the OPUk frame except the OPUk overhead is referred to as the OPUk payload (that is, the payload area of the optical channel frame structure). The payload area can be used for bearing service signals.

FIG. 2 is a schematic diagram that the payload area of the optical channel frame structure is divided into 4 time slots in the optical transport standard in the related art. As shown in FIG. 2, in the definition of the existing optical transport network, the method for loading multiple service signals into the payload of the optical transport network signal is dividing the payload of the optical transport network signal into n time slots, and then loading the service signals into one or more time slots in the payload of the optical transport network signal, wherein the time slots are realized by way of byte interleaving. An exemplary description is given by taking an example that the payload area of the OTUk is divided into 4 time slots. The OTUk frame consists of byte blocks of 4 rows and 3824 columns, an area corresponding to the column numbers from 1 to 16 is the overhead area (not shown), and an area corresponding to the column numbers from 17 to 3824 is the payload area. One small box in FIG. 2 represents one byte, and the OPUk payload area of one OPUk frame consists of 4*3808 bytes, which are arranged in 4 rows and 3808 columns as shown in FIG. 2. FIG. 2 shows the situation in which the OPUk payload is divided into 4 time slots by way of byte interleaving. That is, in a total of 3808 columns, starting from column 17, adjacent 4 bytes form a group, the 4 bytes in each group are divided to 4 different time slots TS1, TS2, TS3, TS4, respectively, that is, 4 consecutive bytes starting from column 17 represent 4 time slots, so that all 4*3808 bytes in the OPUk payload are divided into 4 time slots, named TS1, TS2, TS3, TS4, respectively, and one ODU service can be loaded in m time slots (m is less than the maximum number n of time slots in the OPUk payload; n=4 in FIG. 2).

According to the existing optical transport network standard G.709, the smallest ODUk in the optical transport network is ODU0 and the rate is 1.25G. Thus, theoretically, the OPUk payload in the OTUk frames of all rates should be divided into the slots of 1.25G granularity, so that the ODU0 can be loaded most efficiently. In this case, for some services with small bandwidth, such as FE services, STM-1 services, E1 services, etc., if they are directly carried by time slots, it will lead to serious waste of bandwidth.

To solve the above technical problems, the present disclosure proposes corresponding solutions, which will be exemplarily described below in combination with the accompanying drawings.

FIG. 3 is a flowchart of a method for service processing in optical transport network according to the present disclosure. As shown in FIG. 3, the method for service processing in optical transport network is applied to the sending side, and includes operations S101 to S102.

At Operation S101, a client service is mapped into a service container.

In the present disclosure, the client service specifically refers to a service that is a small-granularity service for the optical transport network frame. Specifically, a ratio of the bandwidth of the client service to the bandwidth of the payload area of the optical transport network frame is less than a preset ratio, and the specific value of the preset ratio is set by professionals in the industry. Generally, the value of the preset ratio is less than or equal to 10%. In the present disclosure, it is only necessary to ensure that the bandwidth of the client service is smaller than the bandwidth of the payload area of the optical transport network frame.

In the present disclosure, the service container includes an ODU frame or an Optical Service Unit (OSU) frame. The process of mapping the client service to the service container belongs to the conventional technology in the art, and will not be repeated here.

At Operation S102, the service container is mapped into a data frame, wherein the data frame includes payload units, each of the payload units consists of unit blocks with fixed length, and the service container is carried in the unit blocks.

Each unit block bears data of at most one service container.

In the present disclosure, the OTN frame may be an ODU frame or a FlexO frame; the data frame consists of the payload area of the ODU frame, or the payload area of the FlexO frame.

FIG. 4 is a schematic diagram of dividing an OTUk frame into unit blocks in the present disclosure. As shown in FIG. 4, taking the division of the payload area of one OTUk frame into unit blocks as an example, the payload area of the OTUk frame can be divided into multiple unit blocks with fixed length; wherein a unit block refers to a fixed number (greater than 1) of consecutive bits, and a service container is carried in the unit block (it can also be regarded as carrying a client service).

Figure 5:
FIG. 5 is a schematic structural diagram of a first-type unit block and a second-type unit block in the present disclosure.
Figure 5:

FIG. 5 is a schematic structural diagram of a first-type unit block and a second-type unit block in the present disclosure. As shown in FIG. 5, the unit blocks can be divided into two types: the first-type unit blocks and the second-type unit blocks. The first-type unit blocks and the second-type unit blocks have a same length. The first-type unit blocks include a payload portion, the second-type unit blocks include a payload portion and an overhead portion. The lengths of the payload portion and the overhead portion can be set according to actual needs, the payload portion is used for bearing service data, and the overhead portion includes the identification information of the service container. For any payload unit, the payload unit consists of a same type of unit blocks.

The identification information of the service container is used for identifying the service container carried by the unit block.

In practical applications, each client service is assigned a corresponding Tributary Port Number (TPN), and the corresponding client service can be identified based on the TPN. Based on the above situation, in the present disclosure, the TPN of the client service carried by the service container may be used as the identification information of the service container.

Obviously, the identification information of the service container in the present disclosure may also be implemented in other forms, as long as the identification information can be used to distinguish different service containers.

In the present disclosure, the overhead portion may further include check information for checking the identification information, so as to ensure the reliability of the identification information in the overhead portion.

It should be noted that, in the present disclosure, the number of the first-type unit blocks and the second-type unit blocks in each frame can be flexibly adjusted according to the type and bandwidth of the carried client service, and is not a fixed value.

For the sake of convenience, it is assumed that division is performed in a case of a unit block of fixed length K; if the payload area can be divided into an integer number of unit blocks and the number of divided unit blocks is N, the bandwidth corresponding to each unit block is Q/N, where Q is the bandwidth of the entire payload area; if the payload area cannot be divided into an integer number of unit blocks, division is performed according to the maximum number of unit blocks that can be divided (assuming that the number of divided unit blocks is N), the remaining data in the payload area is used as filler filled at the end of the frame or distributed between frames. At this time, the bandwidth of each unit block is $K*Q/(N*K+F)$, where F is the number of the filled bits in the payload area, F<K, and $N*K+F$ is the total number of bits in the payload area.

In the present disclosure, if the data frame is divided into N unit blocks, the number of payload units divided from the data frame is at most N, the maximum number of services that can be delivered by the data frame is N (in this case, each payload unit consists of only 1 unit block), and the bandwidth of each unit block may also be small, which can improve bandwidth utilization. The value K of the size of the unit block should not be too large. An excessively large value means that the number of service bits that need to be cached will increase and thus the delay will increase. It should also not be too small. This is because the second-type unit block contains the overhead portion, and the overhead portion occupies some bits. If the value of K is too small, it means that the overhead portion in the unit block occupies a large proportion, and the payload portion for delivering client service data occupies a small proportion, resulting in a low data transmission efficiency. In practical applications, the value of K can be set and adjusted according to actual needs.

The technical solutions of the present disclosure can solve the problem in the prior art of serious bandwidth waste caused by transmitting the optical transport service by dividing the payload area into time slots, and achieve the effect of improving the bandwidth utilization of the optical transport network.

Figure 6:
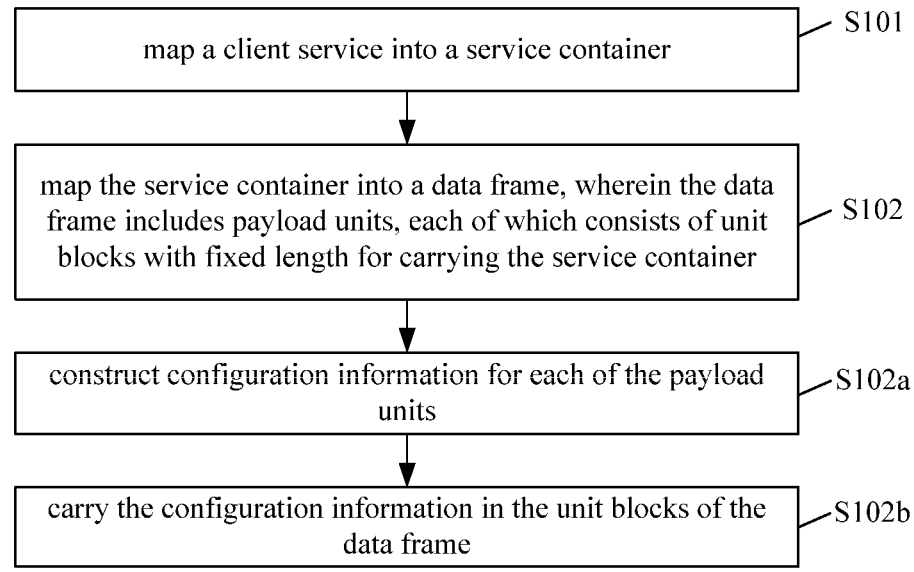
FIG. 6 is another flowchart of a method for service processing in optical transport network according to the present disclosure.

FIG. 6 is another flowchart of a method for service processing in optical transport network according to the present disclosure. As shown in FIG. 6, the method for service processing in optical transport network is applied to the sending side, and includes operations S101 S102b.

At Operation S101, a client service is mapped into a service container.

At Operation S102, the service container is mapped into a data frame, wherein the data frame includes payload units, each of the payload units consists of unit blocks with fixed length, and the service container is carried in the unit blocks.

At Operation S102a, configuration information is constructed for each of the payload units.

FIG. 7 is a schematic structural diagram of configuration information in the present disclosure. As shown in FIG. 7, the configuration information includes: a unit block type of the unit blocks occupied by the payload unit, a payload unit number, and the number of the unit blocks occupied by the payload unit.

In the present disclosure, the unit block type of the first-type unit block is represented by "1", and the unit block type of the second-type unit block is represented by "0"; that is, the information representing the unit block type in each piece of configuration information occupies only 1 bit.

The payload unit number is used in conjunction with the unit block type, and the combination of the "payload unit number" and the "unit block type" can be used to distinguish different payload units. Further, through the combination of the "payload unit number" and the "unit block type", the order of a corresponding payload unit in the subsequent "processing sequence" can be represented, details of which will be described later.

In the present disclosure, the configuration information is configured with check information, and the check information is used for performing individual check on each piece of the configuration information or performing overall check on all the configuration information. As an option, Cyclic Redundancy Check (CRC) or Forward Error Correction (FEC) check is performed on the identification information based on the check information, so as to ensure the reliability of the configuration information.

At Operation S102b, the configuration information is carried in the unit blocks of the data frame.

Fixed number of unit blocks may be preset in the data frame to carry the "configuration information". For example, 5 unit blocks are set to carry the configuration information.

In Operation S102b, according to the preset number (for example, 5) of the unit blocks preconfigured for carrying the configuration information, the distribution of the unit blocks for carrying the configuration information is determined based on sigma-delta algorithm; then, all the configuration information is carried into the determined unit blocks. It should be noted that, if the number of payload units is small, the amount of configuration information will also be small, and the actual number of unit blocks carrying the configuration information may be less than the preset number.

Obviously, in the present disclosure, the location of the unit blocks carrying the configuration information may also be determined in other ways; for example, the sender and the receiver have negotiated in advance that one or several unit blocks in fixed locations in the payload area are used for carrying the configuration information.

In the present disclosure, it is only necessary to ensure that Operations S102a and S102b are performed after Operation S101. For example, Operations S102a and S102b are performed alternately with Operation S102, or both Operations S102a and S102b are performed after Operation S102.

In the present disclosure, the service containers are divided into first-type service containers, second-type service containers, and third-type service containers. The first-type service containers are service containers for carrying services of fixed bit rate that require clock transparent transmission; the second-type service containers are service containers for carrying services of fixed bit rate that do not require clock transparent transmission; and the third-type service containers are service containers for carrying services of variable bit rate. The first-type service containers are carried in the first-type unit blocks, and the second-type service containers and the third-type service containers are carried in the second-type unit blocks.

In the present disclosure, all the first-type service containers are divided into at least one first-type service container group, all the second-type service containers are divided into at least one second-type service container group, and all the third-type service containers are divided into at least one third-type service container group. Each first-type service container group includes at least one first-type service container, each second-type service container group includes at least one second-type service container, and each third-type service container group includes at least one third-type service container.

Each first-type service container group, each second-type service container group, and each third-type service container group correspond to a different payload unit, respectively.

When the multiple first/second/third-type service containers are divided into at least one first/second/third-type service container group, the specific division rules are not limited. For example, all the first/second/third-type service containers are divided into one first/second/third-type service container group; or for a certain type of service containers, all service containers of this type are evenly divided into multiple service container groups; or for a certain type of service containers, all service containers of this type are divided into multiple service container groups containing different numbers of service containers.

In the present disclosure, it is sufficient as long as the number of second/third-type service containers included in each second/third-type service container group does not exceed a preset maximum number of services that can be accommodated. The maximum number of services that can be accommodated can be set by configuring the size of bits used for representing the identification information in the overhead portion of the second-type unit block; for example, the size of bits used for representing the identification information in the overhead portion is a bits, then there are at most $2^a$ types of identification information, and the maximum number of second/third-type service containers that can be accommodated in one second/third-type service container group is at most $2^a$. Exemplarily, if the value of a is 4, the maximum number of the second/third-type service containers that can be accommodated in the second/third-type service container group is $2^4=16$.

FIG. 8 is a flowchart of a specific implementation of Operation S102 in the present disclosure. As shown in FIG. 8, in the present disclosure, Operation S102 includes operations S1021 to S1022.

At Operation S1021, all of the first-type service container groups, the second-type service container groups, and the third-type service container groups are sorted to obtain a processing sequence.

The technical solution of the present disclosure does not limit the rules used in sorting, that is, either random sorting or non-random sorting can be used.

In the present disclosure, sorting may be based on "bandwidth" size.

As an option, first, according to the total bandwidth of services carried by each of the first-type service container groups, all the first-type service container groups are sorted in descending order of total bandwidth to obtain a first sequence; then, according to the total bandwidth of services carried by each of the second-type service container groups, all the second-type service container groups are sorted in descending order of total bandwidth to obtain a second sequence; and next, according to the maximum allocated bandwidth of each of the third-type service container groups, all the third-type service container groups are sorted in descending order of maximum allocated bandwidth, to obtain a third sequence; finally, the second sequence is connected to tail of the first sequence and the third sequence is connected to tail of the second sequence, to obtain the processing sequence (referring to as "sorting method 1" for short).

As another option, according to the total bandwidth of the services carried by each of the first-type service container groups, the total bandwidth of the services carried by each of the second-type service container groups, and the maximum allocated bandwidth of each of the third-type service container groups, all of the first-type service container groups, the second-type service container groups, and the third-type service container groups are sorted in descending order of bandwidth, to obtain the processing sequence.

In the present disclosure, the sorting may be performed according to a "delay priority". A delay priority can be allocated to a service container group according to the delay requirement of each of the client services carried in the service container group; for example, if the client services carried in the service container group have a high delay requirement (i.e., if the delay is required to be small during transmission), a higher delay priority can be allocated to the service container group; if the client services carried in the service container group have a low delay requirement (i.e., a large delay is allowed during transmission), a lower delay priority can be assigned to the service container group. The operation of allocating the delay priority to the service container group may be performed manually, or may be automatically performed by the OTN device based on a certain rule (the allocation algorithm is manually preset). The technical solution of the present disclosure does not limit the specific algorithm used for allocating the delay priority to the service container group.

When performing sorting, first, the delay priority of each of the first-type service container groups, the second-type service container groups, and the third-type service container groups is determined; and then, all of the first-type service container groups, the second-type service container groups, and the third-type service container groups are sorted in descending order of delay priority, to obtain the processing sequence.

After the processing sequence is obtained, each payload unit number is assigned according to the result of the processing sequence and the type of the unit blocks occupied by the payload unit corresponding to each service container group. The specific assignment rules are not limited here (which may be negotiated by the sender and the receiver in advance), and it is only necessary to ensure that the receiver can restore the processing sequence based on the combination of the "payload unit number" and the "unit block type" recorded in all configuration information in subsequent demapping.

At Operation S1022, each of the first-type service container groups, the second-type service container groups and the third-type service container groups is mapped into the unit blocks of the data frame in sequence according to a sequential order in the processing sequence.

FIG. 9 is a flowchart of a specific implementation of Operation S1022 in the present disclosure. As shown in FIG. 9, in the present disclosure, Operation S1022 includes operations S10221 to S10224.

At Operation S10221, for each first-type service container group, the number of the unit blocks need to be occupied by each first-type service container in the first-type service container group is calculated according to a bandwidth of a service carried by the first-type service container group and a bandwidth of the unit blocks, and the numbers of the unit blocks need to be occupied by all the first-type service containers in the first-type service container group are summed, to obtain the number of the unit blocks need to be occupied by the first-type service container group.

Based on the foregoing, it can be known that the bandwidth of each unit block can be obtained when the number N of unit blocks, the size K of the unit block, the size of the payload area, and the bandwidth Q of the payload area are determined. For a first-type service container, the bandwidth of the first-type service container is divided by the bandwidth of the unit block; if the calculation result is an integer, the calculation result is the number of unit blocks need to be occupied by the first-type service container; if the calculation result is not an integer, the calculation result is rounded up to obtain the number of unit blocks need to be occupied by the first-type service container.

At Operation S10222, for each second-type service container group, the number of the unit blocks need to be occupied by each second-type service container in the second-type service container group is calculated according to a bandwidth of a service carried by the second-type service container in the second-type service container group and the bandwidth of the unit blocks, and the numbers of the unit blocks need to be occupied by all the second-type service containers in the second-type service container group are summed, to obtain the number of the unit blocks need to be occupied by the second-type service container group.

The method for calculating the number of unit blocks need to be occupied by the second-type service container is the same as the method for calculating the number of unit blocks need to be occupied by the first-type service container, which will be not repeated here.

At Operation S10223, for each third-type service container group, a maximum allocated bandwidth allocated to the third-type service container group is determined according to bandwidths of services carried by the third-type service containers in the third-type service container group, and the number of the unit blocks need to be occupied by the third-type service container group is calculated according to the maximum allocated bandwidth and the bandwidth of the unit blocks.

In the third-type service container group, the client services carried therein are services of variable bit rate, thus the bandwidth can be shared among these client services. For a certain third-type service container group, according to the maximum bandwidth (also referred to as peak bandwidth) for the services of variable bit rate carried in the third-type service container group, a maximum allocated bandwidth can be allocated to the third-type service container group by a preset algorithm, that is, as the maximum allocated bandwidth allocated to the third-type service container group. It should be noted that the technical solution of the present disclosure does not limit the specific algorithm for determining the "maximum allocated bandwidth", and it is only necessary to ensure that the maximum allocated bandwidth allocated to the third-type service container group is greater than or equal to the peak bandwidth of a service of variable bit rate that has the largest peak bandwidth in the third-type service container group, and is less than or equal to the sum of the peak bandwidths of all the services of variable bit rate in the third-type service container group.

For the third-type service container group, the maximum allocated bandwidth of the third-type service container group is divided by the bandwidth of the unit block; if the calculation result is an integer, then the calculation result is the number of the unit blocks need to be occupied by the third-type service container group; if the calculation result is not an integer, the calculation result is rounded up to obtain the number of the unit blocks need to be occupied by the third-type of service container group.

It should be noted that, when there is no service of fixed bit rate that requires clock transparent transmission in the client service, the first-type service container group does not exist, and Operation S10221 may not be performed in this case; when there is no service of fixed bit rate that does not require clock transparent transmission in the client service, the second-type service container group does not exist, and Operation S10222 may not be performed in this case; when there is no service of variable bit rate in the client service, the third-type service container group does not exist, and Operation S10223 may not be performed in this case.

At Operation S10224, based on the number of the unit blocks need to be occupied by each of the first-type service container groups, the second-type service container groups and the third-type service container groups, each of the first-type service container groups, the second-type service container groups and the third-type service container groups is mapped into the unit blocks of the data frame in sequence according to the sequential order in the processing sequence.

When mapping according to the processing sequence, only one first-type service container group, one second-type service container group, or one third-type service container is processed each time. Mapping a service container group into the unit blocks of the optical transport network frame includes: first, according to the number of the unit blocks need to be occupied by the first-type service container group, the second-type service container group or the third-type service container group, determining a location distribution of the unit blocks occupied by the first-type service container group, the second-type service container group or the third-type service container group based on the sigma-delta algorithm; and then, carrying the first-type service container group, the second-type service container group or the third-type service container group into the determined unit blocks.

In the present disclosure, based on the sigma-delta algorithm, a certain number of unit blocks (obtained by operations S10221 to S10223) need to be occupied by a certain service container group can be evenly distributed in the idle unit blocks (unallocated unit blocks) within the data frame. Therefore, when the number of unit blocks occupied by a certain service container group is certain, if in two frames, the order of this service container group in the processing sequence is changed, the location of the unit blocks occupied by the service container group in the two frames may also be changed. The specific operation process of the sigma-delta algorithm belongs to the conventional technology in the art, and will not be repeated here.

It should be noted that, when the locations of the unit blocks occupied by the configuration information and the unit blocks occupied by the service container groups are both calculated by the sigma-delta algorithm, in order to ensure that the receiving side can obtain all the configuration information first, the locations of the unit blocks occupied by the configuration information should be first calculated by the sigma-delta algorithm and then the unit blocks occupied by the service container groups should be calculated according to the processing sequence and by the sigma-delta algorithm, so that the receiver can accurately determine the unit blocks carrying the configuration information from the data frame according to the "preset number" of the unit blocks for carrying the configuration information and based on the sigma-delta algorithm. In the case that the unit blocks occupied by the configuration information is one or several unit blocks in fixed locations negotiated by the sender and the receiver in advance, the sequence between the operation of mapping the configuration information and the operation of mapping the service container group is not limited.

The above operations S101, S102a, S102b, and S102 are all performed by a sending-side node (an OTN device). After completing the processing of the above operations S101, S102a, S102b, and S102, the sending-side node will send the optical transport network frame containing the ODU frame or the FlexO frame to a receiving-side node (i.e., realizing the sending of the data frame), to realize the sending of the client service.

The receiving-side node may receive the optical transport network frame containing the ODU frame or the FlexO frame (that is, the data frame has been received), and demap the service container from the unit blocks divided from the data frame, and obtain the data of the corresponding client service from the service container.

Figure 10:
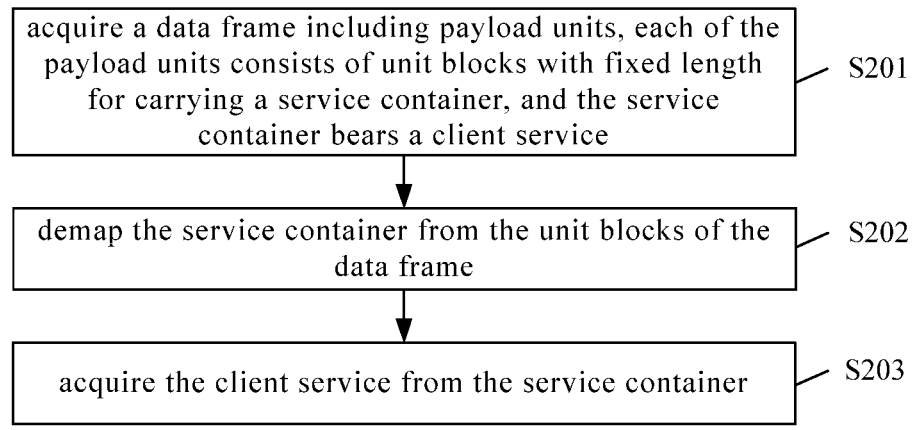
FIG. 10 is still another flowchart of a method for service processing in optical transport network according to the present disclosure.

FIG. 10 is still another flowchart of a method for service processing in optical transport network according to the present disclosure. As shown in FIG. 10, the method for service processing in optical transport network is applied to the receiving side, and includes operations S201 to S203.

At Operation S201, a data frame is acquired, wherein the data frame includes payload units, each of the payload units consists of unit blocks with fixed length, a service container is carried in the unit blocks, and the service container carrys a client service.

At Operation S202, the service container is demapped from the unit blocks of the data frame.

Figure 11:
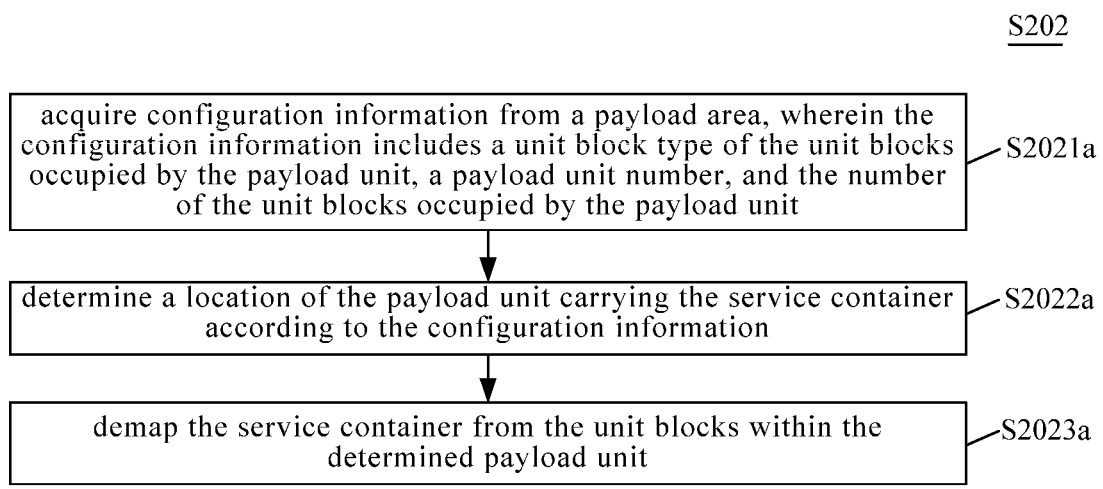
FIG. 11 is a flowchart of a specific implementation of Operation S202 in the present disclosure.

FIG. 11 is a flowchart of a specific implementation of Operation S202 in the present disclosure. As shown in FIG. 11, Operation S202 includes operations S2021a to S2023a.

At Operation S2021a, configuration information is acquired from a payload area, wherein the configuration information includes a unit block type of the unit blocks occupied by the payload unit, a payload unit number, and the number of the unit blocks occupied by the payload unit.

At Operation S2022a, a location of the payload unit carrying the service container is determined according to the configuration information.

At Operation S2023a, the service container is demapped from the unit blocks within the determined payload unit.

Figure 12:
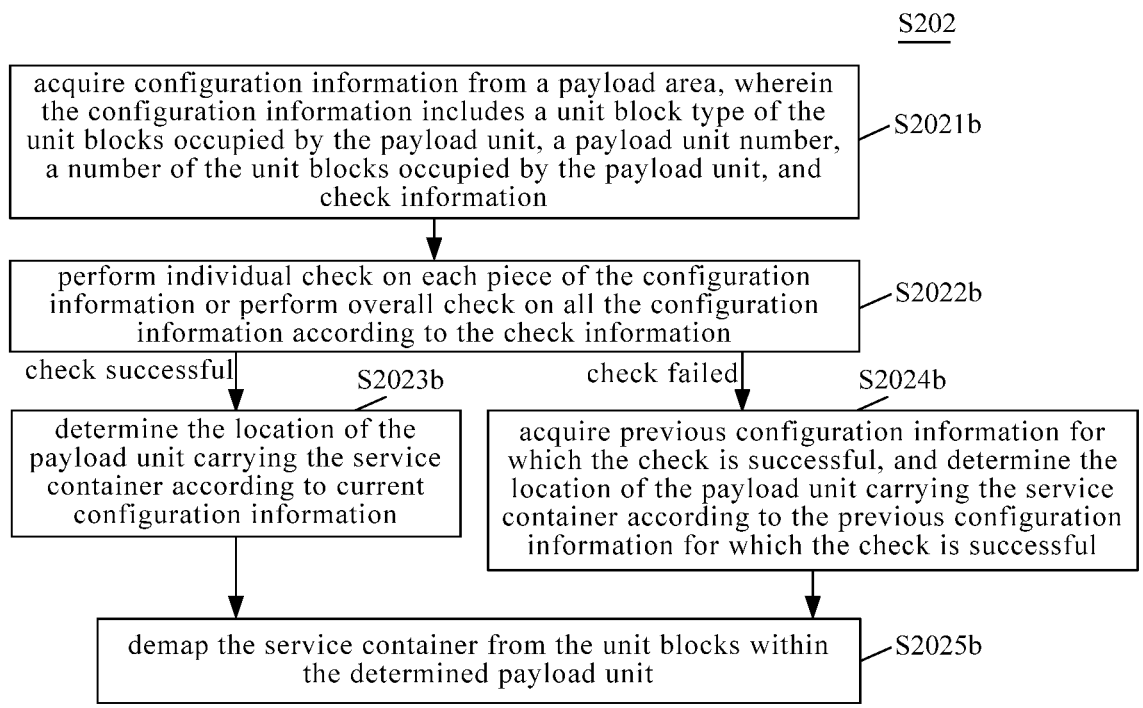
FIG. 12 is another flowchart of a specific implementation of Operation S202 in the present disclosure.

FIG. 12 is another flowchart of a specific implementation of Operation S202 in the present disclosure. As shown in FIG. 12, Operation S202 includes operations S2021b to S2025b.

At Operation S2021b, configuration information is acquired from a payload area, wherein the configuration information includes a unit block type of the unit blocks occupied by the payload unit, a payload unit number, the number of the unit blocks occupied by the payload unit, and check information.

At Operation S2022b, individual check on each piece of the configuration information or overall check on all the configuration information is performed according to the check information.

If the check is successful, then Operation S2023b is performed; if the check is failed, then Operation S2024b is performed.

At Operation S2023b, the location of the payload unit carrying the service container is determined according to current configuration information.

After Operation S2023b ends, Operation S2025b is performed.

At Operation S2024b, previous configuration information for which the check is successful is acquired, and the location of the payload unit carrying the service container is determined according to the previous configuration information for which the check is successful.

After Operation S2024b ends, Operation S2025b is performed.

At Operation S2025b, the service container is demapped from the unit blocks within the determined payload unit.

Operation S203, the client service is acquired from the service container.

The technical solution of the present disclosure will be described in detail below with reference to specific examples.

Example I

Between two OTN devices, 5 services of fixed bit rate that require clock transparent transmission, 3 services of fixed bit rate that do not require clock transparent transmission, and 10 services of variable bit rate are communicated by OTU2 frames; wherein the 5 service of fixed bit rate that require clock transparent transmission have bandwidths of 10 Mbps, 20 Mbps, 30 Mbps, 40 Mbps, 50 Mbps, respectively, the 3 services of fixed bit rate that do not require clock transparent transmission have promised bandwidths of 5 Mbps, 8 Mbps and 10 Mbps, respectively, and a maximum allocated bandwidth allocated to the 10 services of variable bit rate is 50 Mbps.

Figure 13:
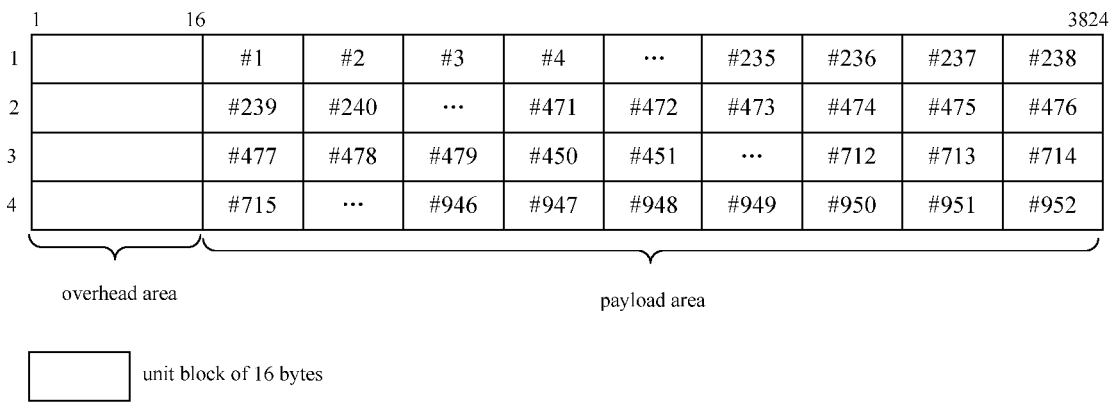
FIG. 13 is a schematic diagram of dividing a payload area of an ODU0 frame into unit blocks by 16 bytes in the present disclosure.
Figure 14:
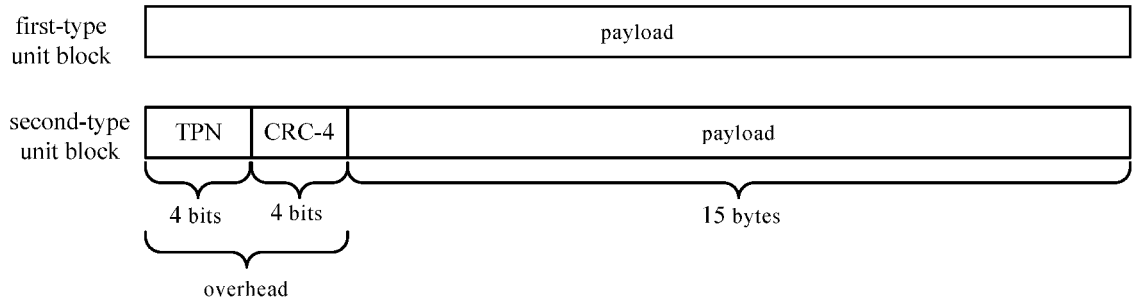
FIG. 14 is another schematic structural diagram of a first-type unit block and a second-type unit block in the present disclosure.

FIG. 13 is a schematic diagram of dividing a payload area of an ODU0 frame into unit blocks by 16 bytes in the present disclosure. FIG. 14 is another schematic structural diagram of a first-type unit block and a second-type unit block in the present disclosure. As shown in FIGS. 13 and 14, it is assumed that the data frame consists of one ODU frame, and the payload area of the ODU frame is divided into unit blocks with a length of 16 bytes. In this case, the payload area is divided into 952 unit blocks with fixed length of 16 bytes; wherein in the second-type unit block, 1 byte is configured as the overhead portion, and the remaining 15 bytes are used as the payload portion. In the overhead portion, 4 bits are used to indicate the identification information of the service container (in this example, taking the identification information being the TPN of the client service carried by the service container as an example), and the remaining 4 bits are used to indicate the CRC-4 check information.

It can be obtained by calculation that the bandwidth corresponding to each unit block is about 1.3 Mbps. For the first-type unit block, the bandwidth corresponding to the payload portion is about 1.3 Mbps; for the second-type unit block, the bandwidth corresponding to the payload portion thereof is 1.3 Mbps*15/16≈1.22 Mbps.

Operation 1, on the sending side, 5 services of fixed bit rate with respective bandwidths of 10 Mbps, 20 Mbps, 30 Mbps, 40 Mbps, 50 Mbps that require clock transparent transmission are mapped into 5 first-type service containers, respectively, wherein the 5 first-type service containers are represented by OSU#1 to OSU#5; 3 services of fixed bit rate with respective promised bandwidths of 5 Mbps, 8 Mbps, and 10 Mbps that do not require clock transparent transmission are mapped into 3 second-type service containers, respectively, wherein the 3 second-type service containers are represented by OSU#6 to OSU#8, respectively; 10 services of variable bit rate are mapped into 10 third-type service containers, respectively, wherein the 10 third-type service containers are represented by OSU#11 to OSU#20, respectively.

Operation 2, on the sending side, the first-type service containers OSU#1 to OSU#5 are divided into 5 first-type service container groups, wherein the 5 first-type service container groups are represented as OSUG#1 to OSUG#5, respectively, and the first-type service container group OSUG#i contains the first-type service container OSU#i, i∈[1, 100] and is an integer; 3 second-type service containers OSU#6 to OSU#8 are divided into one second-type service container group, and the one second-type service container group is represented as OSUG#6; 10 third-type service containers OSU#11 to OSU#20 are divided into one third-type service container group, and the one third-type service container group is represented as OSUG#7.

Operation 3, on the sending side, the numbers of unit blocks occupied by the first-type service container groups OSUG#1 to OSUG#5, by the second-type service container group OSUG#6, and by the third-type service container group OSUG#7, are calculated respectively.

The first-type service containers correspond to the first-type unit blocks, and the second-type service containers correspond to the second-type unit blocks.

For the first-type service container groups OSUG#1 to OSUG#5, taking the calculation for the first-type service container group OSUG#1 as an example, the number of first-type unit blocks need to be occupied by the first-type service container group OSUG#1 is 10 Mbps/1.3 Mbps, rounded up to 8. Similarly, the numbers of first-type unit blocks need to be occupied respectively by the first-type service container groups OSUG#2 to OSUG#5 can be calculated as 16, 24, 31, and 39.

For the second-type service container group OSUG#6, it includes the second-type service containers OSU#6 to OSU#8; the number of second-type unit blocks need to be occupied by the second-type service container OSU#6 is 5 Mbps/1.22 Mbps, rounded up to 5, the number of second-type unit blocks need to be occupied by the second-type service container OSU#7 is 8 Mbps/1.22 Mbps, rounded up to 7, and the number of second-type unit blocks need to be occupied by the second-type service container OSU#8 is 10 Mbps/1.22 Mbps, rounded up to 9, 5+7+9=21, that is, the number of second-type unit blocks need to be occupied by the second-type service container group OSUG#6 is 21.

For the third-type service container group OSUG#7, the number of second-type unit blocks occupied thereby is 50 Mbps/1.22 Mbps, rounded up to 41, that is, the number of second-type unit blocks need to be occupied by the third-type service container group OSUG#7 is 41.

Operation 4, on the sending side, the first-type service container groups OSUG#1 to OSUG#5, the second-type service container group OSUG#6, and the third-type service container group OSUG#7 are sorted, to obtain a processing sequence.

Assuming sorting according to the aforementioned "sorting method 1", a processing sequence C can be obtained:

C={OSUG#5, OSUG#4, OSUG#3, OSUG#2, OSUG#1, OSUG#6, OSUG#7}

In this example, the performing order of operations 1 to 4 is not limited. For example, it is also possible that sorting is performed first, and then the numbers of unit blocks occupied by the payload units corresponding to respective service container groups are calculated.

Operation 5, on the sending side, configuration information for the payload units corresponding to respective service container groups OSUG#1 to OSUG#7 is constructed.

For any of the service container groups, all the unit blocks occupied by the service container group constitute the payload unit corresponding to the service container group, and corresponding configuration information may be constructed for the payload unit corresponding to the service container group.

Figure 15:
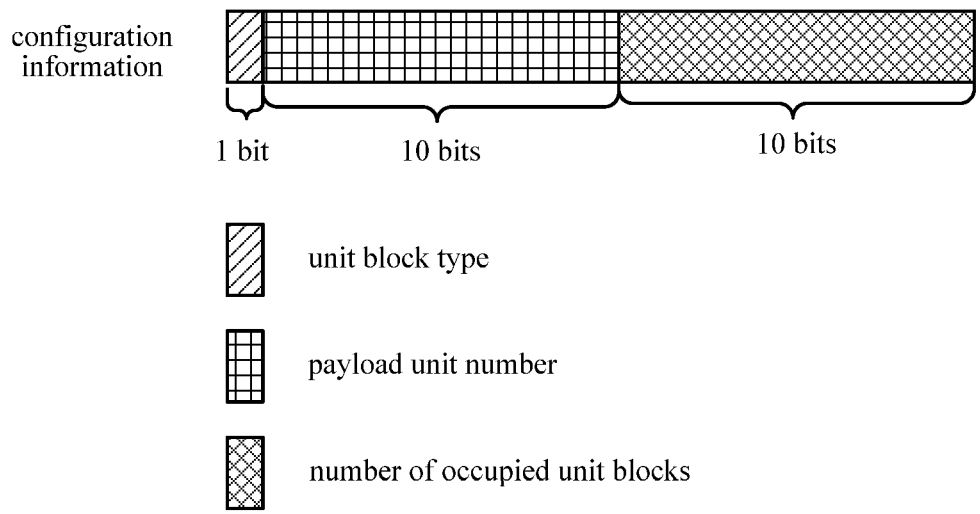
FIG. 15 is another schematic structural diagram of configuration information in the present disclosure.

FIG. 15 is another schematic structural diagram of configuration information in the present disclosure. As shown in FIG. 15, each piece of the configuration information includes: a unit block type of the unit blocks occupied by the payload unit, a payload unit number, and the number of the unit blocks need to be occupied; wherein the unit block type occupies 1 bit, the payload unit number occupies 10 bits, and the number of the unit blocks occupies 10 bits.

It is assumed that the payload unit numbers allocated to the service container groups OSUG#5, OSUG#4, OSUG#3, OSUG#2, OSUG#1, OSUG#6, and OSUG#7 are 5, 4, 3, 2, 1, 1, and 2, respectively. At this point, the configuration information of the service container groups OSUG#5, OSUG#4, OSUG#3, OSUG#2, OSUG#1, OSUG#6, and OSUG#7 is as follows:

OSUG#5: 1 (unit block type), 5 (processing number), 39 (the number of occupied unit blocks);
OSUG#4: 1, 4, 31;
OSUG#3: 1, 3, 24;
OSUG#2: 1, 2, 16;
OSUG#1: 1, 1, 8;
OSUG#6: 0, 1, 21;
OSUG#7: 0, 2, 41.

The unit block type "1" indicates the unit bock is the first-type unit block (which includes a payload portion only), and the unit block type "0" indicates the unit bock is the second-type unit block (which includes an overhead portion and a payload portion).

For payload units occupying different types of unit blocks, they may have the same payload unit numbers, because two payload units can be distinguished based on the combination of the "unit block type" and the "payload unit number". In addition, the order of these payload units in the processing sequence can also be determined based on the combination of the "unit block type" and the "payload unit number".

For example, in the above example, based on the combination of the unit block type "1" and the payload unit number "5", it can be determined that the order of the service container group corresponding to this payload unit is the $1^{st}$ in the processing sequence; in the above example, based on the combination of the unit block type "1" and the payload unit number "4", it can be determined that the order of the service container group corresponding to this payload unit is the $2^{nd}$ in the processing sequence; . . . based on the combination of the unit block type "0" and the payload unit number "2", it can be determined that the order of the service container group corresponding to this payload unit is the $7^{th}$ in the processing sequence. The corresponding rule between the combination of the "unit block type" and the "payload unit number" and the "order" in the processing sequence are negotiated by the sender and receiver in advance, and the present disclosure does not limit the corresponding rule.

Operation 6, on the sending side, assuming that the number of the unit blocks configured in advance for carrying configuration information is 5, the locations of the 5 unit blocks in the 952 idle unit blocks can be determined according to the sigma-delta algorithm, and then all the configuration information is carried into the determined 5 unit blocks.

Operation 7, on the sending side, based on the processing sequence, the first-type service container groups OSUG#5 to OSUG#1, the second-type service container group OSUG#6, and the third-type service container group OSUG#7 are sequentially mapped into corresponding unit blocks.

First, mapping is performed on the first-type service container groups OSUG#5. Specifically, according to the sigma-delta algorithm, the specific distribution locations of 31 unit blocks need to be occupied by the first-type service container group OSUG#5 in 952−5=947 idle unit blocks are calculated, and the first-type service container OSU#5 is carried into the determined 31 first-type unit blocks.

Then, mapping is performed on the first-type service container group OSUG#4. At this point, the number of idle unit blocks is 947−31=916. According to the sigma-delta algorithm, the specific distribution locations of 24 unit blocks need to be occupied by the first-type service container group OSUG#5 in 916 idle unit blocks are calculated, and the first-type service container OSU#4 is carried into the determined 24 first-type unit blocks.

Based on the same processing method, the remaining 3 first-type service container groups OSUG#3 to OSUG#1, 1 second-type service container groups OSUG#6 and 1 third-type service container groups OSUG#7 are mapped to idle units in sequence, respectively.

The locations of the first-type unit blocks occupied by each of the first-type service container groups OSUG#5 to OSUG#1 in different frames are fixed. Although the locations of the second-type unit blocks occupied by each of the second-type service container group OSUG#6 and the third-type service container group OSUG#7 in different frames are fixed, since the second-type unit blocks include the identification information of the service containers, the locations of the second-type unit blocks occupied by each of the second-type service containers OSU#6 to OSU#8 in the second-type service container group OSUG#6 in different frames may be variable, and the locations of the second-type unit blocks occupied by each of the third-type service containers OSU#11 to OSU#20 in the third-type service container group OSUG#7 in different frames may be variable.

Operation 8, on the sending side, the ODU0 frame is mapped into the ODU2 frame, packed as the OTU2 frame and sent.

Operation 9, on the receiving side, the OTU2 frame is received and demapped to the ODU0 frame.

Operation 10, on the receiving side, based on the sigma-delta algorithm, the distribution locations of 5 unit blocks for carrying the configuration information of the payload unit are determined, and then all the configuration information is acquired therefrom.

When there is check information in the configuration information, the configuration information can be checked based on the check information, and the specific description may refer to the forgoing, which will not be repeated here.

Operation 11, based on all the configuration information, the processing sequence is restored according to the combination of the "unit block type" and the "payload unit number" in the configuration information.

Operation 12, based on the restored processing sequence, and based on the sigma-delta algorithm, the distribution of the unit blocks contained in the payload units corresponding to respective first-type service container groups OSUG#5 to OSUG#1, the second-type service container group OSUG#6, and the third-type service container group OSUG#7 is determined in sequence.

Operation 13: the corresponding service containers OSU#1 to OSU#8 and OSU#11 to OSU#20 are demapped from the unit blocks contained in respective payload units, and the corresponding client services are acquired from the service containers.

Figure 16:
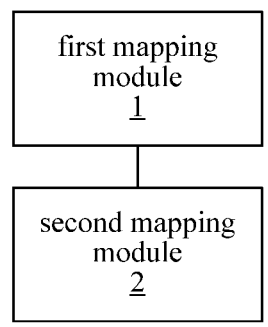
FIG. 16 is a structural block diagram of an apparatus for service processing in optical transport network according to the present disclosure.

FIG. 16 is a structural block diagram of an apparatus for service processing in optical transport network according to the present disclosure. As shown in FIG. 16, the apparatus for service processing can be used for implementing the method for service processing in optical transport network provided by the forgoing embodiments, and includes a first mapping module 1 and a second mapping module 2.

The first mapping module 1 is configured to map a client service into a service container; and the second mapping module is configured to map the service container into a data frame, wherein the data frame includes payload units, each of the payload units consists of unit blocks with fixed length, and the service container is carried in the unit blocks.

For the specific description of the modules in this embodiment, reference may be made to the corresponding content in the foregoing embodiments, which will not be repeated here.

Figure 17:
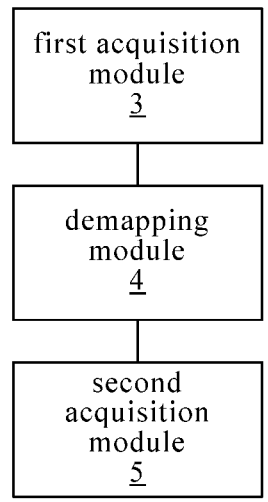
FIG. 17 is another structural block diagram of an apparatus for service processing in optical transport network according to the present disclosure.

FIG. 17 is another structural block diagram of an apparatus for service processing in optical transport network according to the present disclosure. As shown in FIG. 17, the apparatus for service processing can be used for implementing the method for service processing in optical transport network provided by the forgoing embodiments, and includes a first acquisition module 3, a demapping module 4, and a second acquisition module 5.

The first acquisition module 3 is configured to acquire a data frame, wherein the data frame includes payload units, each of the payload units consists of unit blocks with fixed length, a service container is carried in the unit blocks, and the service container carrys a client service; the demapping module 4 is configured to demap the service container from the unit blocks of the data frame; and the second acquisition module 5 is configured to acquire the client service from the service container.

For the specific description of the modules in this embodiment, reference may be made to the corresponding content in the foregoing embodiments, which will not be repeated here.

It should be noted that, in the present disclosure, the OTN device may include both the modules in the apparatus for service processing shown in FIG. 16 and the modules in the apparatus for service processing shown in FIG. 17. That is, the OTN device can act as both a service sender and a service receiver.

Figure 18:
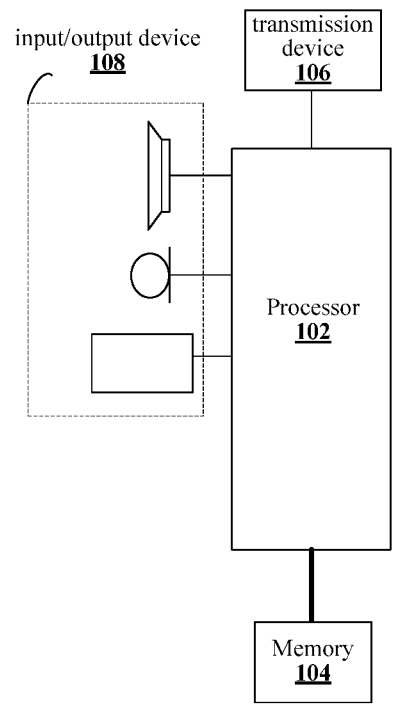
FIG. 18 is a structural block diagram of an electronic device according to the present disclosure.

FIG. 18 is a structural block diagram of an electronic device according to the present disclosure. As shown in FIG. 18, the electronic device 10 may be a mobile terminal, a computer terminal or a similar computing device. The electronic device 10 includes one or more processors 102 (only one is illustrated in the figure, the processor 102 may include, but is not limited to, a processing device such as a MCU or a PLD) and a memory 104; wherein one or more programs are stored in the memory 104. When executed by the one or more processors 102, the one or more programs cause the one or more processors to implement the steps in the methods for service processing provided in the foregoing embodiments.

In the present disclosure, the above mobile terminal may further include a transmission device 106 used for a communication function and an input/output device 108. It will be understood by those of ordinary skill in the art that the structure shown in FIG. 18 is only for illustration, and does not limit the structure of the above mobile terminal. For example, the mobile terminal 10 may further include more or less components than those shown in FIG. 18, or have a configuration different from that shown in FIG. 18.

The memory 104 may be configured to store computer programs, for example, software programs and modules of application software, such as computer programs corresponding to the method for service processing in optical transport network in the present disclosure. By running the computer program stored in the memory 104, the processor 102 executes various functional applications and data processing, that is, to implement the aforementioned method. The memory 104 may include high-speed random access memory, and may also include non-volatile memory, such as one or more magnetic storage devices, flash memories, or other non-volatile solid-state memories. In some instances, the memory 104 may further include memories located remotely from the processor 102, and these remote memories may be connected to the mobile terminal 10 through a network. The instances of such network include, but are not limited to, the Internet, an intranet, a local area network, a mobile communication network, and combinations thereof.

The transmission device 106 is configured to receive or transmit data via a network. The specific instance of the aforementioned network may include a wireless network provided by the communication provider of the mobile terminal 10. In an instance, the transmission device 106 includes a Network Interface Controller (NIC), which can be connected to other network devices through the base station so as to communicate with the Internet. In an instance, the transmission device 106 may be a Radio Frequency (RF) module, which is configured to communicate with the Internet wirelessly.

The present disclosure also provide a computer readable medium on which a computer program is stored, and when the program is executed by a processor, the operations in the methods for service processing provided in the foregoing embodiments are implemented.

It will be understood by those of ordinary skill in the art that all or some of the steps in the methods disclosed above, functional modules/units in the system and the apparatus can be implemented as software, firmware, hardware, and appropriate combinations thereof. In a hardware implementation, the division between functional modules/units mentioned in the above description does not necessarily correspond to the division of physical components; for example, one physical component may have multiple functions, or one function or step may be executed cooperatively by several physical components. Some or all physical components may be implemented as software executed by a processor, such as a central processing unit, digital signal processor or microprocessor, or may be implemented as hardware, or as an integrated circuit, such as an application specific integrated circuit. Such software may be distributed on computer readable media, which may include computer storage media (or non-transitory media) and communication media (or transitory media). As known to those of ordinary skill in the art, the term computer storage media includes both volatile and nonvolatile, both removable and non-removable media that are implemented in any method or technology configured to store information (such as computer readable instructions, data structures, program modules or other data flexible). The computer storage medium includes, but is not limited to, Read-Only Memory (RAM), Random Access Memory (ROM), Electrically Erasable Programmable Read-Only Memory (EEPROM), flash memory or other memory technology, Compact Disc Read-Only Memory (CD-ROM), Digital Video Disc (DVD) or other optical disk storage, magnetic cartridge, magnetic tape, magnetic disk storage or other magnetic storage devices, or may any other medium configured to store desired information and which can be accessed by a computer. In addition, as is well known to those of ordinary skill in the art, communication media typically contain computer readable instructions, data structures, program modules, or other data in a modulated data signal such as a carrier wave or other transmission mechanism, and can include any information delivery media.

Exemplary embodiments have been disclosed herein, and although specific terms are employed, they are used for and should only be construed as a general descriptive sense and not for purposes of limitation. In some instances, it will be apparent to those skilled in the art that features, characteristics and/or elements described in connection with a particular embodiment may be used alone or used in combination with features, characteristics and/or elements described in connection with other embodiments, unless expressly stated otherwise. Accordingly, it will be understood by those of ordinary skill in the art that various changes in form and details may be made therein without departing from the scope of the present disclosure as set forth in the appended claims.

What is claimed is:

1. A method for service processing in optical transport network, comprising:
   mapping a client service into a service container; and
   mapping the service container into a data frame;
   constructing configuration information for each of the payload units, wherein the configuration information comprises a unit block type of the unit blocks occupied by the payload unit, a payload unit number, and the number of the unit blocks occupied by the payload unit; and
   carrying the configuration information in the unit blocks of the data frame,
   wherein the data frame comprises payload units, each of the payload units consists of first-type unit blocks with fixed length or second-type unit blocks with fixed length, the fixed length of the first-type unit block is same as the fixed length of the second-type unit block, and the service container is carried in the first-type unit blocks or the second-type unit blocks,
   wherein the first-type unit blocks comprise a payload portion, and the second-type unit blocks comprise a payload portion and an overhead portion, the payload portion is used for bearing service data, and the overhead portion comprises identification information of the service container,
   wherein the service container is divided into a first-type service container, a second-type service container and a third-type service container;
   the first-type service container is a service container for carrying a service of fixed bit rate that requires clock transparent transmission;
   the second-type service container is a service container for carrying a service of fixed bit rate that does not require clock transparent transmission;
   the third-type service container is a service container for carrying a service of variable bit rate; and
   the first-type service container is carried in the first-type unit block, and the second-type service container and the third-type service container are carried in the second-type unit block.

2. The method of claim 1, wherein all the first-type service containers are divided into at least one first-type service container group, all the second-type service containers are divided into at least one second-type service container group, and all the third-type service containers are divided into at least one third-type service container group, each first-type service container group comprises at least one first-type service container, each second-type service container group comprises at least one second-type service container, and each third-type service container group comprises at least one third-type service container; and
   each first-type service container group, each second-type service container group, and each third-type service container group correspond to a different payload unit, respectively.

3. The method of claim 2, wherein mapping the service container into the data frame comprises:
   sorting all of the first-type service container groups, the second-type service container groups, and the third-type service container groups to obtain a processing sequence; and
   mapping each of the first-type service container groups, the second-type service container groups and the third-type service container groups to the unit blocks of the data frame in sequence according to a sequential order in the processing sequence.

4. The method of claim 3, wherein sorting all of the first-type service container groups, the second-type service container groups, and the third-type service container groups to obtain the processing sequence comprises:
   sorting, according to a total bandwidth of services carried by each of the first-type service container groups, all the first-type service container groups in descending order of total bandwidth to obtain a first sequence;
   sorting, according to a total bandwidth of services carried by each of the second-type service container groups, all the second-type service container groups in descending order of total bandwidth to obtain a second sequence;
   sorting, according to a maximum allocated bandwidth of each of the third-type service container groups, all the third-type service container groups in descending order of maximum allocated bandwidth to obtain a third sequence; and
   connecting the second sequence to tail of the first sequence and connecting the third sequence to tail of the second sequence, to obtain the processing sequence.

5. The method of claim 3, wherein sorting all of the first-type service container groups, the second-type service container groups, and the third-type service container groups to obtain the processing sequence comprises:
   determining a delay priority of each of the first-type service container groups, the second-type service container groups, and the third-type service container groups; and
   sorting all of the first-type service container groups, the second-type service container groups, and the third-type service container groups in descending order of delay priority, to obtain the processing sequence.

6. The method of claim 3, wherein sorting all of the first-type service container groups, the second-type service container groups, and the third-type service container groups to obtain the processing sequence comprises:
   sorting, according to the total bandwidth of the services carried by each of the first-type service container groups, the total bandwidth of the services carried by each of the second-type service container groups, and the maximum allocated bandwidth of each of the third-type service container groups, all of the first-type service container groups, the second-type service container groups, and the third-type service container groups in descending order of bandwidth.

7. The method of claim 1, wherein the configuration information is configured with check information, and the check information is used for performing individual check on each piece of the configuration information or performing overall check on all the configuration information.

8. The method of claim 1, wherein the service container comprises an ODU frame or an OSU frame.

9. An electronic device, comprising:
one or more processors; and
a memory storing one or more programs thereon, wherein the one or more programs, when executed by the one or more processors, cause the one or more processors to implement the method of claim 1.

10. A non-transitory computer readable medium storing a computer program thereon, wherein the computer program, when executed by a processor, cause the processor to implement the method of claim 1.

11. A method for service processing in optical transport network, comprising:
acquiring a data frame, wherein the data frame comprises payload units, each of the payload units consists of first-type unit blocks with fixed length or second-type unit blocks with fixed length, the fixed length of the first-type unit block is same as the fixed length of the second-type unit block, a service container is carried in the unit blocks, and the service container carries a client service;
demapping the service container from the unit blocks of the data frame; and
acquiring the client service from the service container,
wherein the first-type unit blocks comprise a payload portion, and the second-type unit blocks comprise a payload portion and an overhead portion, the payload portion is used for bearing service data, and the overhead portion comprises identification information of the service container,
wherein the service container is divided into a first-type service container, a second-type service container and a third-type service container;
the first-type service container is a service container for carrying a service of fixed bit rate that requires clock transparent transmission;
the second-type service container is a service container for carrying a service of fixed bit rate that does not require clock transparent transmission;
the third-type service container is a service container for carrying a service of variable bit rate; and
the first-type service container is carried in the first-type unit block, and the second-type service container and the third-type service container are carried in the second-type unit block.

12. The method of claim 11, wherein demapping the service container from the unit blocks of the data frame comprises:
acquiring configuration information from a payload area, wherein the configuration information comprises a unit block type of the unit blocks occupied by a payload unit, a payload unit number, and the number of the unit blocks occupied by the payload unit;
determining a location of the payload unit carrying the service container according to the configuration information; and
demapping the service container from the unit blocks within the determined payload unit.

13. The method of claim 12, wherein the configuration information is configured with check information; and
before determining the location of the payload unit carrying the service container according to the configuration information, the method further comprises:
performing individual check on each piece of the configuration information or performing overall check on all the configuration information according to the check information; and
in response to the check being successful, determining the location of the payload unit carrying the service container according to the configuration information.

14. The method of claim 13, further comprising:
in response to the check being failed, acquiring previous configuration information for which the check is successful, and determining the location of the payload unit carrying the service container according to the previous configuration information for which the check is successful.

15. An electronic device, comprising:
one or more processors; and
a memory storing one or more programs thereon, wherein the one or more programs, when executed by the one or more processors, cause the one or more processors to implement the method of claim 11.

16. A non-transitory computer readable medium storing a computer program thereon, wherein the computer program, when executed by a processor, cause the processor to implement the method of claim 11.

17. An apparatus for service processing in optical transport network, comprising:
a first mapping module configured to map a client service into a service container; and
a second mapping module configured to map the service container into a data frame,
wherein the data frame comprises payload units, each of the payload units consists of first-type unit blocks with fixed length or second-type unit blocks with fixed length, the fixed length of the first-type unit block is same as the fixed length of the second-type unit block, and the service container is carried in the unit blocks,
wherein the first-type unit blocks comprise a payload portion, and the second-type unit blocks comprise a payload portion and an overhead portion, the payload portion is used for bearing service data, and the overhead portion comprises identification information of the service container,
wherein the service container is divided into a first-type service container, a second-type service container and a third-type service container;
the first-type service container is a service container for carrying a service of fixed bit rate that requires clock transparent transmission;
the second-type service container is a service container for carrying a service of fixed bit rate that does not require clock transparent transmission;
the third-type service container is a service container for carrying a service of variable bit rate; and
the first-type service container is carried in the first-type unit block, and the second-type service container and the third-type service container are carried in the second-type unit block.

* * * * *